July 20, 1943.  H. J. APPEL  2,324,474
SUCCESSIVE SWITCHING APPARATUS
Filed Dec. 21, 1940  4 Sheets-Sheet 1

INVENTOR
Henry J. Appel

BY Ira L. Nickerson
ATTORNEY

July 20, 1943.   H. J. APPEL   2,324,474
SUCCESSIVE SWITCHING APPARATUS
Filed Dec. 21, 1940   4 Sheets-Sheet 2

INVENTOR
Henry J. Appel
BY *Ira L. Nickerson*
ATTORNEY

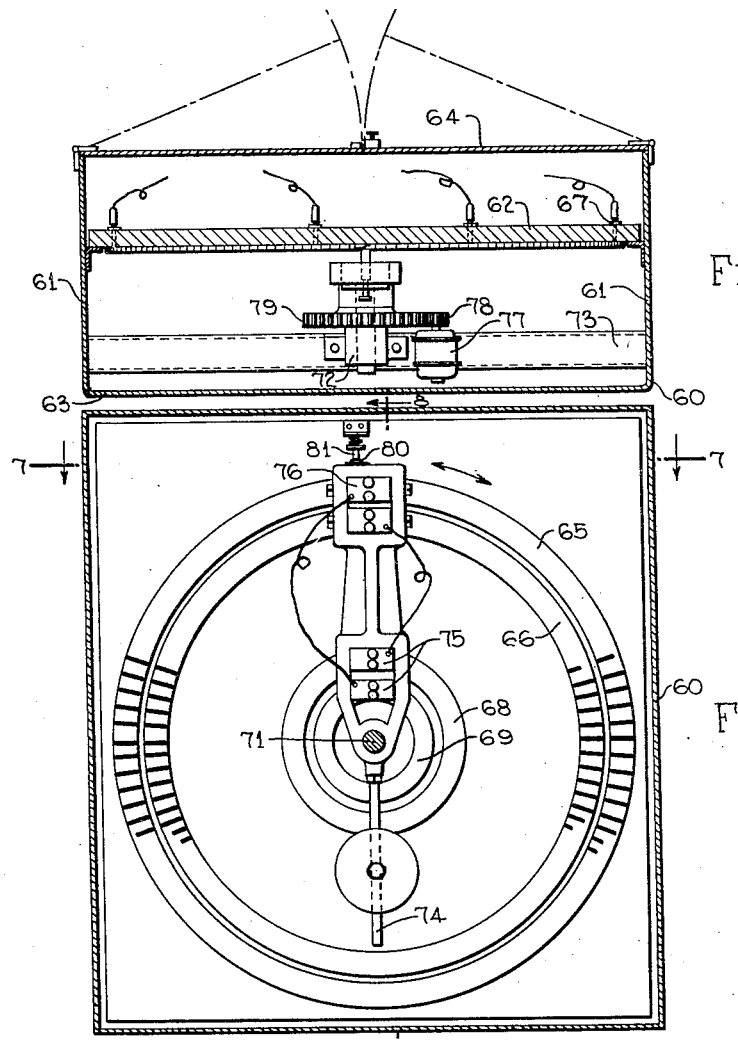
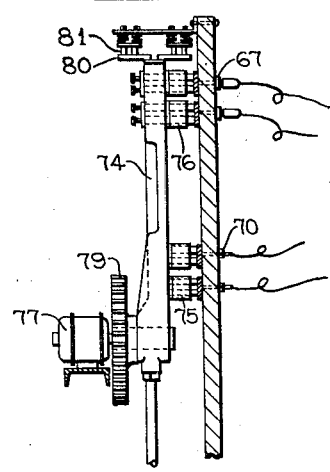

Patented July 20, 1943

2,324,474

UNITED STATES PATENT OFFICE 2,324,474

SUCCESSIVE SWITCHING APPARATUS

Henry J. Appel, Philadelphia, Pa., assignor, by mesne assignments, to Houdry Process Corporation, Wilmington, Del., a corporation of Delaware Application December 21, 1940, Serial No. 371,181

18 Claims. (Cl. 171—97)

This invention relates to apparatus for automatically controlling and regulating the cycle of steps of industrial processes which are carried out in predetermined sequence and it is particularly concerned with such apparatus for controlling the flow of different fluid mediums. In certain aspects the invention may be considered as an improvement on or further development of the invention disclosed in the copending application of Henry Thomas, John M. Pierson and Edward J. Nopper, Serial No. 160,122, filed August 20, 1937 for a Cycle timer apparatus which issued on July 29, 1941, as Patent No. 2,250,507.

It is an object of the invention to provide a time controller for a cycle of events which is made up of a minimum number of parts but readily adaptable for regulating numerous operations. Another object is to construct such a controller which is compact in form and with its parts arranged to be readily accessible for inspection and repair. Another object is to provide an apparatus which is capable of regulating processes having varying cycle times and/or numbers of operating steps. Another object is to provide apparatus for independently controlling operations of mechanisms and independently testing the operations. Another object is to provide independent groups of controls for separately effecting recurring operations of a process. Another object is to provide a timing apparatus having a series of electrical contacts which are energized in sequence by an energizing arm which is adapted to move over any selected number or series of contacts at a predetermined speed and in either direction of travel between the end segments of the selected number. And another object is to provide control means in association with the timing apparatus to insure the sequential energization of the contacts and to prevent further movement of the energizing arm when a contact is not properly energized. Various other objects will be manifested as the detailed description proceeds.

In carrying out the invention in accordance with certain preferred applications, apparatus is provided having separate groups of control elements wherein predetermined elements of each group are operably associated with mechanisms to be controlled and each group of elements carries out separate operations initiated by means of a movable contact or energizing arm put in motion at any desired speed through the medium of a motor and variable gearing and the elements of one group may operate independently of the elements of another group or elements of a plurality of groups may simultaneously function. The number of control elements included in each group may vary greatly and the cycle of operations may begin and end on any selected segments, or the movable contact arm may be moved to initiate operations in either or both paths of travel or a second set of control groups may be used to complete a cycle of operation, one set functioning when the movable contact arm is traveling in one direction while the other set functions when the motion of the arm is reversed. Or according to another application of the invention, each group of control elements may separately control a cycle of operations or the groups may operate serially to control a cycle.

In its broadest aspects the invention is applicable to mechanical as well as electrical control but in the latter application finds its greatest utility in simplicity and compactness of apparatus and certainty of operation. It is within the purview of the invention to electrically separate the control elements of a cycle timer by the use of different kinds of current for actuating elements having different types of operations, such as opening or closing a valve and testing the operation of the valve opening or closing, which may be accomplished by the use of A. C. current for one type of operation and D. C. current for another type, or the same control elements may be used to effect different types of operations and the circuits from the elements may also be electrically isolated from each other by the use of relays or rectifiers.

The objects and novel features of the invention will become evident from the following detailed description and the accompanying figures of the drawings. It will be understood, however, that the particular embodiments of the invention disclosed in the drawings are for the purpose of illustration only and that the invention is not to be limited thereby.

Referring to the drawings wherein similar parts are indicated by like numerals,

Fig. 6 is a vertical section of a modified form of the invention;

Fig. 7 is a horizontal section on the line 7—7 of Fig. 6;

Fig. 8 is a partial vertical section on the line 8—8 of Fig. 6;

Figure 1:
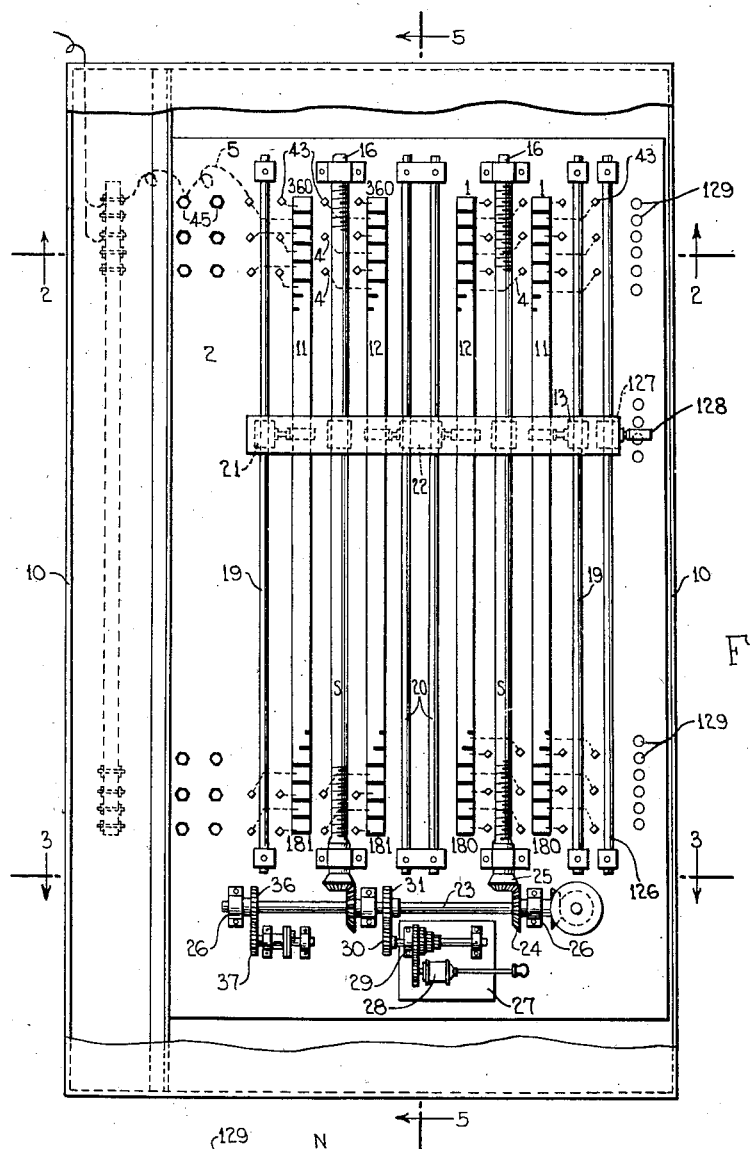
Fig. 1 is a sectional-elevational view of an embodiment of the invention.

Referring to Fig. 1 of the drawings, 10 indicates generally a casing enclosing the timing mechanism which is made up of sets of separate parallel segment groups 11 and 12 of insulated segments which are removably secured to the front face of a panel 2 constructed of insulating material, and a movable contact or energizing arm 13 disposed above the segments and carrying sets of contact brushes 14 and 15 (Fig. 2) to coact with the groups of segments. The segment groups are separated physically from each other and each group functions to carry out independent operations and although two sets of the segment groups 11 and 12 are shown in the preferred embodiment, the invention may be readily carried out with a single set of two or more segment groups. The movable contact arm 13 is adapted to be reciprocated over the segments to pass the brushes in physical contact therewith and, as shown, the preferred means for moving the arm comprises one or, as shown, a plurality of lead screws S which are rotatably held in bearings 16 fixed to the panel and cooperating with movable screw-threaded sleeves 17 enclosed in insulated blocks 18 rigidly held by the brush arm. Two sets of stationary contact guide rails 19, 19 and 20, 20 are secured to the panel and disposed parallel to the segment sets and the arm 13 is slidably associated with the rails by means of suitable guide bearings 21 fixed adjacent the arm ends to receive the rails 19 and a bearing 22 to receive the rails 20. The bearings 21 are made of material capable of conducting electric current from the rails 19 to the brushes 14 for energizing the segments of group 11 while the single bearing 22 carrying both rails 20 should be of insulating material and provided with metallic bushings for conducting current from the rails 20 to the brushes 15 for energizing the segments of group 12 but at the same time insulating the rails from each other, and both sets of rails are electrically connected with the sets of contact brushes 14 and 15 through flexible leads 3.

Figure 3:
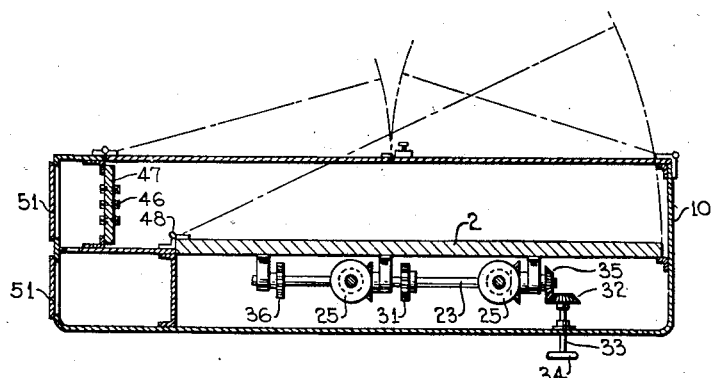
Fig. 3 is a horizontal section on the line 3—3 of Fig. 1.
Figure 5:
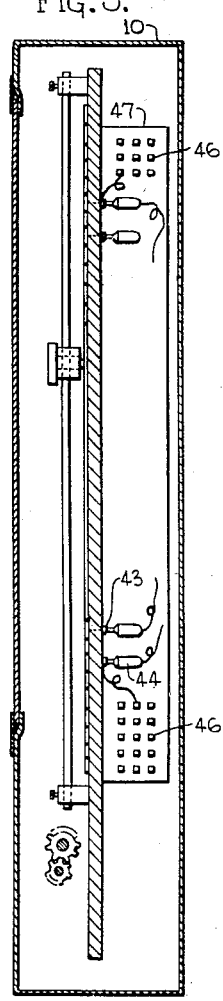
Fig. 5 is a vertical section on line 5—5 of Fig. 1.

The lead screws S are rotated through a shaft 23 having fixed thereon a pair of miter gears 24 adapted to cooperate with similar gears 25 at one end of the screws and the shaft 23 is rotatably secured to the panel by means of suitable bearings 26 and is rotated through the medium of a gear box drive 27 which comprises a reversible synchronous motor 28 and a set of variable ratio gears 29 for driving a pinion 30 at any selected speed, which in turn rotates a gear 31 fixed to the shaft 23. The direction of travel of the arm 13 may be reversed directly through the energization of any selected segment to reverse the motor 28 or it may be reversed by means of a time delay relay actuated by any selected segment. When it is desired to reciprocate the contact arm by hand, the gear box drive 27 may be disengaged from the shaft 23 by a declutching mechanism contained in the gear box and a gear wheel 32 (Fig. 3) connected through a slidable shaft 33 to a hand wheel 34 and may be forced into engagement with a gear 35 disposed at one end of the shaft.

In order to provide a quick make and break contact with the segments of each group 11 and 12; to regulate the time of contact between the brushes and segments; to indicate when the brushes are at the center of the segments; as well as to prevent arcing when the brushes pass over the segments, a mechanical arrangement for actuating a series of mercury switches (clearly shown in Fig. 4) is provided and comprises a gear wheel 36 fixed to shaft 23 which operates an adjustable cam 37, fixed to another shaft 38, to raise and lower one arm of a bell crank lever 40 pivoted to a bracket 41 and carrying the switches 42, 43, 44. The switches 42 and 43 are electrically connected with the guide rails 19 and 20 respectively at the right of Fig. 1 when the arm 13 is traveling in one direction and alternately electrically connected to rails 19 and 20 at the left of the figure when the arm is traveling in the other direction, and the switch 44 may be connected to a suitable light or other signal.

Figure 2:
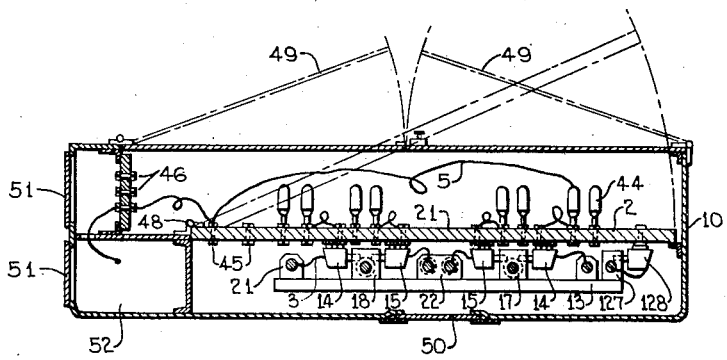
Fig. 2 is a horizontal section on the line 2—2 of Fig. 1.

Each segment of the control groups is joined by leads 4 to hollow connectors 43 located in the panel board and forming receptacles adapted to receive hand plugs 44 which are in turn connected by leads 5 to terminal posts 45 having electrical connections leading to the mechanism to be controlled. The hand plugs 44 are wired to the terminal posts 45 so that any plug may be moved and inserted in any of the hollow connectors. As shown in Fig. 2 these connections lead to terminal posts 46 located in a sub-panel 47 and from the sub-panel all the leads may be grouped together and be confined in compartment 52.

The parts of the control apparatus heretofore described are enclosed within the casing 10 in such a manner that all parts thereof are compactly arranged and easily accessible for repair or replacement. This is accomplished by hinging the panel 2 at 48 in spaced relation to the front and rear faces of the casing and securing the timer parts to either side of the panel as clearly shown in Figs. 2 and 3. The back wall of the casing may be provided with hinged doors 49 which are adapted to swing outwardly to permit the outward movement of the panel for ready access to all the mechanism while the device is operating. The front face of the casing may, as shown, be provided with a glassed opening 50 for giving a ready indication of the position of the contact arm 13 and one end of the casing may be provided with removable doors giving access to the sub-panel terminal posts and lead compartment 52.

In the mechanical operation of the apparatus it will be seen from Fig. 1 the arm 13 will travel from segment 1 or any segment selected as the starting segment downwardly through the rotation of the screws S by the motor, and upon reaching segment 180 or any segment selected as the reversing segment the arm will travel in the reverse direction. The segments of the segment groups 11 and 12 at the right of the figure may control the operations of mechanisms during both directions of travel of the arm or only in one direction and the arm returned to the starting segment by a suitable fast reset motor to begin a new cycle of operations or the sets 11 and 12 at the right of the figure may control the operations of mechanisms only when the arm travels in one direction to carry out only a part of a cycle while the other set at the left of the figure controls the operation of mechanism when the travel of the arm is reversed to complete the cycle of operations and the arm positioned ready for a new cycle.

Figs. 6, 7 and 8 show a modified apparatus embodying the principle of the invention, capable of being constructed in compact form and utilized in a confined space, and comprises a casing indicated generally at 60 having side walls 61 to which is fixed a panel board 62 by suitable brackets for positioning the panel in spaced relation to the front and rear walls 63 and 64 respectively. The panel is constructed of insulating material and is provided with two concentric rows 65 and 66 of insulated segments which are connected by segment bolts 67 formed integral or otherwise for securing the segments rigidly to the panel. The segment bolts are of hollow construction and adapted to receive hand plugs which are connected by leads to the mechanisms to be controlled. A pair of collector rings 68 and 69 of current conducting material are positioned centrally of the panel and secured thereto by bolts 70 which are directly connected to a power source. A shaft 71 is disposed in front of the panel and positioned centrally thereof and rotatably held in a bearing 72 fixed to a channel bracket 73 which is suitably secured to the end walls of the casing. A counterweighted arm, generally shown at 74, fixed to the shaft 71 and adapted to be rotated therewith, carries a set of brushes 75, adapted to cooperate with the collector rings 68 and 69 and a second set of brushes 76 adapted to cooperate with the segment rows 65 and 66, and the sets of brushes are interconnected for transferring power from the source through the collector rings to the segments. The shaft 71 is driven by a reversible motor 77, disposed on the channel bracket 73 through a pinion 78 associated with the motor and a gear wheel 79 fixed to the shaft 71. The drive for the shaft, as disclosed in the description of Fig. 1, may be a gear box drive comprising a reversible synchronous motor and variable gears.

In the operation of the apparatus just described, selected segments of each row 65 and 66 are connected with mechanisms to be operated and each row of segments is adapted to carry out separate functions similarly to the groups of control segments of the main embodiment of Fig. 1 and the arm may be rotated in either direction from any selected starting segment for successively contacting selected segments and initiating a control of the mechanisms connected to segments to control one complete cycle of operations for each revolution or the arm may be reversed and the cycle completed in both directions.

If it is desired to use this apparatus for processes which require a great number of operations and consequently a great number of control segments it may be adapted to control a cycle of operations in two revolutions or more revolutions by providing a row of segments for each revolution and by using one set of segments for control during the first revolution and the other set or sets for control during the second revolution or other revolutions and the change-over of control power from one set to the other or other sets may be made at the end of a revolution by providing, as shown in Fig. 8, a pair of contact strips 80 mounted at the end of arm 74 and adapted to coact with contact buttons 81 fixed to the panel. The buttons may be secured adjacent any segment in order to begin a cycle at any predetermined segment. The duplicate sets of contacts are provided to assure proper operation and they become energized at the end of a revolution when the contact strips 80 are in contact with the buttons 81 completing a circuit to actuate any well known stepping relay for alternately changing the control current from one collector ring to the other collector ring to alternately energize the segment sets. In this adaptation of the apparatus each segment may be electrically connected to control two or more operations and in order to electrically isolate the circuits and eliminate any interference in the form of electrical feed back, relays or rectifiers may be interposed in the circuit to separate the circuits and permit the segments to carry out more than one function.

Two timers of the type shown in Figs. 1–5 or of the type shown in Figs. 6–8 may be used in parallel so that one acts as a spare for the other, in which case the extra unit may be electrically connected as is the unit in service but its contact guide rails are not energized and its motor is not normally operated. By means of an adjustable rigid coupling the drive shafts of each unit are connected to rotate together so that the movable contact arm of the spare unit is actuated in synchronism with the contact arm of the one in service. In case the main timer fails to properly function both contact arms will be in the same relative position and the other unit can be put in service by declutching the motor of the faulty unit, clutching the motor of the spare unit and energizing the required contactors for starting the movement of the contact arm in the proper direction and simultaneously energizing the corresponding guide rails or collector rings to pass current to the segments.

Figure 9:
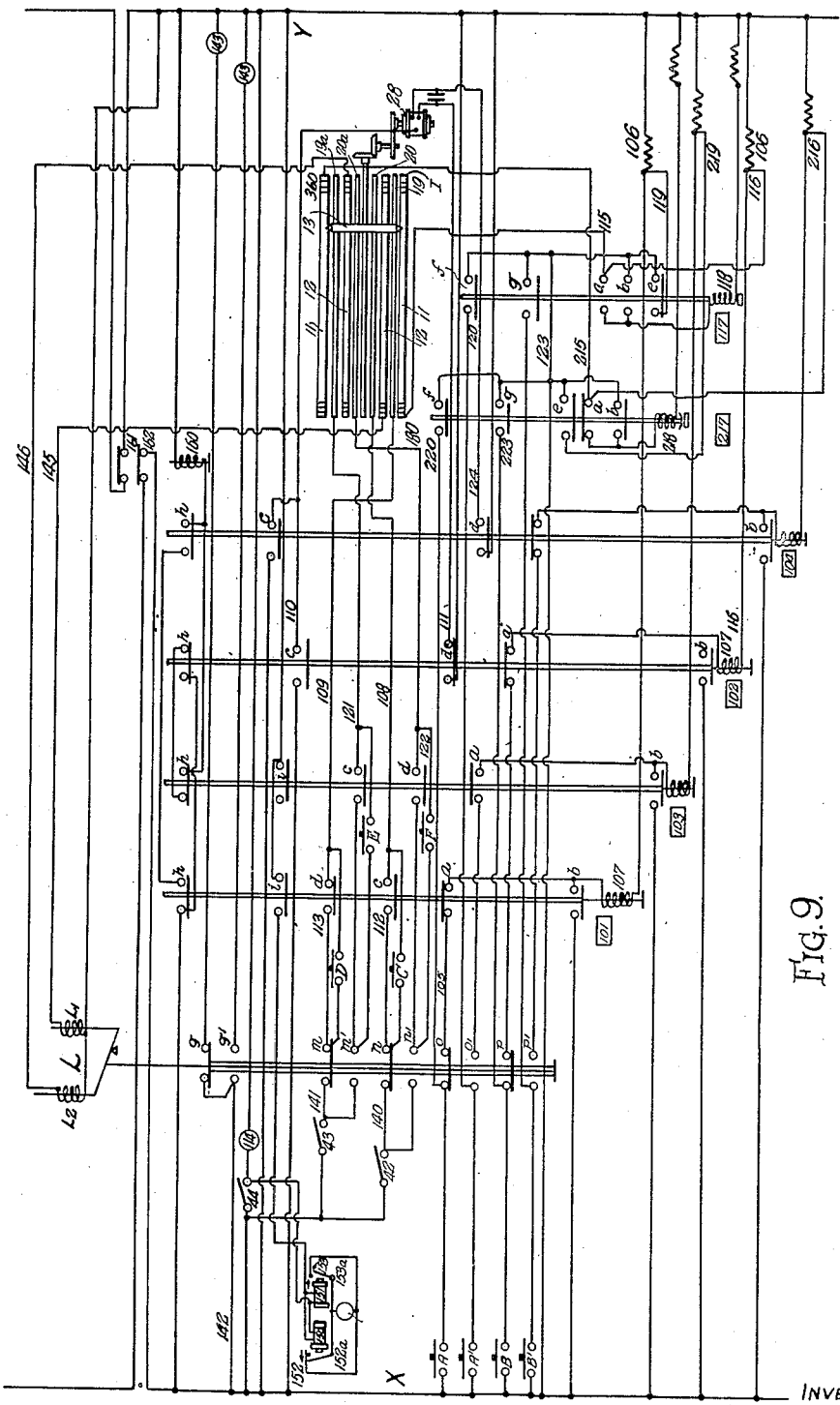
Fig. 9 is a wiring diagram of certain relays and controls for operating the apparatus.

In Fig. 9 the various electrical control circuits are shown applied to a somewhat diagrammatic representation of a timer having two separate groups of segments, each group being adapted for controlling different operations or steps of a process cycle. As indicated, the groups contain 180 segments, this number having been arbitrarily selected but it will be appreciated that the apparatus can function with any desired number of segments. Only segments 1 and 180 and 360 are numbered and indicate either the starting and last segment, or the starting and reversing segment. If the electrical control circuits are applied to the main embodiment of the invention, segment 180 would act as a reversing segment and the process operations effected in both directions of travel of the contact arm, or if applied to the modification of the apparatus as shown in Fig. 6, segment 360 would be representative of the last segment and the cycle completed in one or more revolutions without reversing the direction of travel of the contact arm.

Power for the various circuits is obtained from the bus lines $x$ and $y$ which may supply either alternating or direct current for controlling the contactors, relays, signals, etc. of the apparatus. Four contactors indicated at 101, 102, 103 and 104 are included in the circuit and each is provided with switches $a$, $b$, $c$ and $d$ adapting all the contactors to function similarly in controlling the current flow to the various parts of the apparatus. Before the timer is placed in operation the switches of the respective contactors will all be in the position shown in the diagram and as each contactor becomes energized the position of the switches will be reversed. The switch $a$ will momentarily receive power from the bus lines $x$ and $y$ through the lead 105 and resistance 106 and energize the solenoid 107 closing switches $b$, $c$, and $d$ and opening switch $a$. Switch $b$ acts to hold or seal the current flow through the closed switches $c$ and $d$ until the contactors again become deenergized. Since the contactor switches are similar the reference characters are indicated only in connection with contactor 101.

Figure 4:
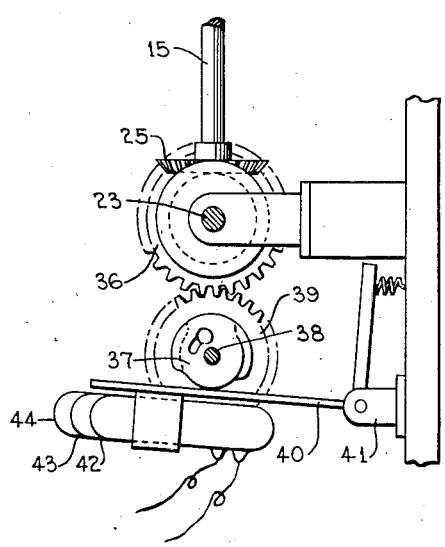
Fig. 4 is a detail of Fig. 1.

To start the timing apparatus the control switches A and B are closed, supplying power from the bus lines $x$ and $y$ through switches $o$ and $p$ of lockout relay L, which is to be described in detail later, to the contactor 101, which is connected to the guide rails 19 and 20 through its switches $c$, $d$ and leads 108 and 109 and simultaneously supplying power to contactor 102 which is connected to the motor 28 through its switches c, d and leads 110 and 111. The motor drives the shaft 23 and moves the arm 13 by means of the screws S from segment 1 in its advance movement towards segment 180 and the adjustable cam 37 heretofore referred to in the description of Fig. 4 is simultaneously rotated through the shaft 23 to raise and lower the mercury switches 42 and 43 to open and close the circuit and periodically supply current to the advance guide rails 19 and 20 through switches m and n of lockout relay L and leads 112 and 113 which are connected through c and d of contactor 101 with the contact rail leads 108 and 109 for providing momentary impulse to the segments at approximately the time the brushes reach the middle of each segment. Mercury switch 44, which is simultaneously rocked by the cam 37, closes the circuit to a light signal 114 for indicating the time the control brushes reach the center of the segment and the impulses are given. The segments which are connected to mechanisms to be operated are energized at the time the impulse is given and the respective operations of the mechanisms are carried out until segment 180 is reached or until any segment is reached which has been selected to reverse the direction of travel of the arm 13 and this segment is connected to contactor 102 through lead 115 and tap-off 116, causing contactor 102 to become deenergized and the motor 28 stopped. Simultaneously a time delay relay 117 which has been set to reverse the motor and cause the arm 13 to begin its travel in the reverse direction by the end of the time period it takes the arm to pass between segments, is energized through lead 115 and switches e, f and g become closed through solenoid operated mechanism 118 which opens switch a and closes switch b of relay 117. The switch e deenergizes contactor 101 to which it is connected through lead 119 and releases the current from the advance contact guide rails 19 and 20. Within the time period for which the time delay relay is set, the power may again be restored to rails 19 and 20 from which it was released by reenergizing contactor 101, and by using interposing relays in the circuits the same cycle of operations may be carried out while the arm is reversing as was effected during the previous travel of the arm, or the cycle of operations may be completed in the reverse travel of the arm. If two sets of segment groups are used as illustrated in Fig. 1 the current will be transferred by contactor 103 when relay 117 closes switch f which is connected to contactor 103 by lead 120 and switch $o_1$ of lockout relay L to pass current from the contactor to the second or return set of contact rails 19 and 20 by leads 121 and 122, and only the second set of segment groups function as the arm reverses its direction of travel. Switch g energizes the contactor 104 through lead 123 and switch $p_1$ of lockout relay L and the motor is reversed through lead 124 connecting the contactor 104 with the motor.

A second time delay relay 217 similar to 117 may be used with the second set of segments to function in a manner exactly similar to that of relay 117 in order to reverse the motor after the cycle is completed, or relay 117 may be used and functioned to reverse the direction of travel of the arm upon the completion of a cycle. As indicated in Fig. 9, a second time delay relay 217, which has been set to reverse the motor and cause the arm 13 to again begin its travel in the advance direction by the end of the time period it takes the arm to pass between segments, is energized, for example, as shown by segment 360 through line 215 and switches e, f, g of relay 217 become closed by solenoid operated mechanism 218 which opens switch a and closes switch b of relay 217. The switch e deenergizes contractor 103 to which it is connected through lead 219 and releases the current from the return contact guide rails 19 and 20 and the current will be transferred through switch f of contactor 217, lead 220, switch o of lockout relay L and lead 105 to close switches c and d of contactor 101 and pass current to advance rails 19 and 20 through leads 112, 113, 108 and 109. When switch g closes, contactor 102 is energized through 223 and switch p of lockout relay L and the motor 28 is reversed through leads 110 and 111 and switches c and d of contactor 102. Switches $A_1$ and $B_1$ operate through switches $o_1$ and $p_1$ of lockout relay L to supply power through switches c and d of contactors 103 and 104, respectively, to supply power to the rails and to the motor when it is desired to initiate the return travel of the contact arm 13.

A mechanical interlock is provided between contactors 101 and 103 which controls current flow to the contact rails and likewise the contactors 102 and 104 controlling the motor are interlocked so that it is only possible to have one current controlling contactor and one motor controlling contactor operating at one time.

It is preferred to use a time delay relay for reversing the direction of travel of the arm 13 since it permits the time interval between segments to elapse before the reversal of the operation of the apparatus takes place. However the time delay relay may be eliminated and the operation of the apparatus reversed by providing an extra segment for reversing the motor after segment 180 or after any segment selected as the last operating segment and reenergizing the contact rails or transferring the current to a second set of rails. The reversing segments may also be used to stop the main motor drive and cut in a fast reset motor for returning the arm to the starting segment within the time required for the arm to pass between segments when driven by the main motor.

If it is desired to manually operate the apparatus, for example, between segments 1 and 180, the motor 28 is declutched and the time delay relay 117 is disconnected from service and the switch A only is closed, closing contactor 101 which supplies power to the guide rails 19 and 20 as in the automatic operation. The arm 13 may then be moved by rotating the drive shaft by hand to effect the operation of the timer to sequentially control the steps of process. When it is necessary to control only a few operations of a process rather than all the operations the contact arm is moved manually and current supplied to the selected segment or segments only when the brushes are in contact with the segments. All of the contactors will be in open position and no current flowing to the contact rails, but as the arm passes over each segment of the timer a signal will be given by the light 114 at the time the arm is at the center of each segment, by mercury switch 44 which is rocked by the cam 37 closing the circuit between the bus lines x and y. At the time the signal is made on the segment on which it is desired to carry out an operation the switch C is closed, passing current to the advance contact rail 19 through switch n of lockout relay L or switch D is closed, passing current to the contact rail 20, through switch $m$ of lockout relay L depending on which group of segments contains the desired operating segment or segments. A second pair of switches E, F, may be provided when another set of segment groups is utilized for completing the cycle of operations as in the embodiment of Fig. 1 and these switches when closed can pass current directly to the other or return set of contact rails 19 and 20 through lockout relay L and switches $m_1$ and $n_1$ and leads 121 and 122.

Figure 10:
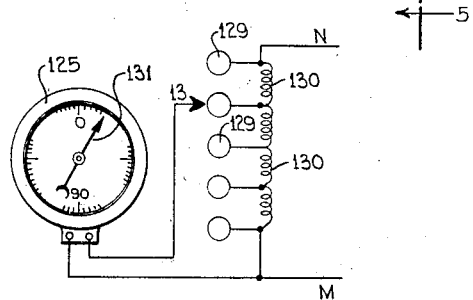
Fig. 10 is a diagrammatic view of a detail.

Fig. 10 discloses an apparatus which may be utilized with any of the forms of the timers heretofore described, to indicate at a remote point the position of the contact arm relative to the actuating segments if for any reason a timer is so located as not to be readily visible in order to give directly the position of the contact arm. The apparatus may take the form of a conventional voltmeter shown generally at 125 having a dial graduated into sufficient divisions to give an indication of each segment as the brush arm comes in contact therewith and as shown is provided with 180 divisions, adapting it for use with the embodiments of the invention shown in the drawings. An arrangement for using the indicating apparatus is disclosed only in connection with Figs. 1 and 2, although it is readily applicable to the modifications of Figs. 6, 7, 8 and includes an additional contact rail 126 fixed to the panel 2 and a cooperating slide bearing 127 secured to the arm 13 which is connected to an additional contact brush 128 by a suitable lead for conveying current thereto. A series of buttons 129, preferably one for each actuating segment is fixed to the panel and positioned to coact with the brush 128 as the arm is moved. The contacts 129 are interconnected by means of resistance 130 of equal value and all the resistances are connected across a constant direct current source through bus lines M, N; while the voltmeter is connected across M and contact arm 13 to complete the circuit. The voltmeter functions as an indicator by employing the potential drop across the resistances 130 and as the brush 128 successively contacts the buttons 130, the indicating arm 131 travels in a clockwise direction indicating the segment with which the arm 13 is in contact. When a second set of segment groups is used for completing the cycle in the reverse direction of travel of the arm an extra guide rail, contact brush and set of buttons may be provided and the dial graduated into 360 divisions or different colored lights, or other signals may be used to denote the direction of travel of the arm or the particular revolution the arm is making if the timer of Fig. 6 is used for controlling the operations.

The various switches controlled by lockout relay L heretofore mentioned are connected in circuit with the contactors 101, 102, 103 and 104 and relays 117 and 217 in a manner to prevent any improper operation of the timer and to preclude the possibility of any step of a process from being started or effected out of its proper sequence during the process cycle. The present improvements are designed to eliminate the faulty operation of the timer itself through its internal circuits and to prevent inaccurate control of a process due to errors of judgment of an operator. Specifically the present improvements are incorporated in the timing apparatus in order to insure that the direction of movement of the contact arm will always be correct in order to effect the process steps in their proper sequence, to insure that current is being supplied to the proper contact rails during each half of the cycle and that the contact arm is moving only in the proper direction during each half of the cycle.

The lockout relay L is made up of coils $L_1$ and $L_2$ and two sets of switches, $m, n, o, p, q$ and $m_1, n_1, o_1, p_1, q_1$, which are alternately actuated to closed position by the coils $L_1$ and $L_2$ in accordance with the direction of movement of the energizing arm 13 of the timer as will be later described. Assume switches $m, n, o, p$ and $q$ to be closed then when the push button starting switch A for energizing one set of the contact rails 19 and 20 is closed, current from the bus line X will pass through line 105 and through the closed switch $o$ of the lockout relay L. From switch $o$ of the lockout relay current will flow to switch $a$ of contactor 101 which closes switches $c$ and $d$ of this contactor and current will flow from bus line X and mercury switches 42 and 43 to lines 108, 109 and finally to contact rails 19 and 20 as heretofore described. When the push button B for starting the motor to drive the arm 13 in one direction is closed, current will flow from bus line X through the closed switch $p$ of lockout relay L. From switch $p$ of the lockout relay current is supplied to contactor 102 which closes switches $c$ and $d$ of this contactor and current passes through lines 110 and 111 to the motor 28 for starting the same as heretofore described. For manual operation other circuits and push buttons are used to energize guide rails 19 and 20, respectively. This is accomplished by providing push buttons C and D which, when closed for manual operation, pass current from mercury switches 42 and 43 and lines 140 and 141, respectively, through closed switches $m$ and $n$ of the lockout relay then to lines 108 and 109 and guide rails 19 and 20. In order to indicate the direction of travel of the arm 13 line 142 supplies current directly from bus line X to closed switch $q$ of the lockout relay L and to a signal light 143.

The description of the figure so far covers only the switches $m, n, o, p, q$ of the lockout relay L in the control of current to the lower set or advance contact rails 19 and 20 but it is to be understood that the switches $m_1$—$n_1$—$o_1$—$p_1$ and $q_1$ in actual operation of the timer would be used to control the current to the upper set or return contact rails 19 and 20 and would be in circuit with these rails in a manner similar to switches $m, n, o, p$ and $q$. It will also be understood that a separate set of push button switches A, B, C, D, whose functions have been described in conjunction with the right to left or advance movement of contact arm 13 will be provided in the various circuits for the left to right or return movement of the arm.

In operation one coil $L_1$ of the relay L will be in circuit with a selected segment, for example segment 180 by line 145 of either of the advance segment rows 11 or 12 and the other coil $L_2$ will be in circuit by line 146 with the end segment, for example segment 360 of either of the return segment rows 11 or 12. When the arm 13 is advanced from the starting to the selected segment and returned from the selected to the end segment by the driving means 28, coil $L_1$ or $L_2$ is energized when the segment with which it is connected is energized by the arm 13. By way of further explanation the arm 13 will be assumed to be advancing from segment 1 to segment 180 after starting a new cycle and after the arm 13 had been in contact with segment 360 at the end of the previous cycle. When coil $L_2$ was energized through segment 360, as previously described, the switches $m$, $n$, $o$, $p$ and $q$ were closed and current was supplied to the advance contact rails 19 and 20 for the advance segment rows through the closed switches $o$ and $p$ of the relay L if the timer was motor operated or through the closed switches $m$ and $n$ if the timer was manually operated. When these contact rails were energized the light 143 would be on and would indicate by a desired color the advance direction of travel of the arm 13. Since switches $m_1$—$n_1$—$o_1$—$p_1$ and $q_1$ are held open by the energized coil $L_2$ no current could pass to the return sets of contact rails 19 and 20 until the selected segment 180 is reached at which time the coil $L_1$ becomes energized which opens switches $m$, $n$, $o$, $p$ and $q$ and consequently cuts current from the advance contact rails and closes switches $m_1$—$n_1$—$o_1$—$p_1$ and $q_1$ to supply current only to the return set of contact rails when the arm 13 is reversed.

The phase of the invention above described provides an arrangement whereby the proper contact rails will be energized in accordance with the direction of travel of the contact arm, for example assume the timer to be in use in controlling a cycle of operation and the arm 13 which is advancing from the segment 1 toward segment 180 is stopped due to some faulty operation and it is again started to continue the cycle of operation, as soon as the main current is on in bus lines $x$ and $y$ the same switches on lockout relay L will be closed that were closed before the timer had stopped. If the operator now desires to complete the cycle by hand he can tell by the indicating light the direction of travel of arm 13 before it had stopped and if he operated the wrong set of manual operating push buttons C and D, the timer would not function since the switches $m_1$ and $n_1$ would be open and it would be necessary to operate the proper set of manual buttons C and D and also rotate the drive screw S in the proper direction in order to continue the cycle. If he desires to continue the cycle automatically it will be necessary for him to operate the proper A and B push buttons for energizing the proper contact rails 19 and 20 and for starting the motor 29 to rotate the drive screw S in the right direction since switches $o_1$ and $p_1$ are open and if the wrong set of buttons A and B are operated no current will pass to the timer.

When the timer has been started properly the rails which should be energized in accordance with the direction of travel of arm 13 may become deenergized or the motor 28 may fail to move the arm 13, either of which conditions would interrupt the cycle of operation. In order to detect these faulty conditions a pair of cooperating relays 150 and 151 are employed and are both in circuit with the mercury switch 44 which, as heretofore described, indicates by light 114 when the segments are momentarily energized by the contact arm. A switch $i$ of each of the rail contactors 101 and 103 completes the circuit between bus lines $x$ and $y$, as indicated. The relays 150 and 151 are arranged in parallel but 150 functions to pull the switch arm 152 toward contacts 152a, while 151 functions to hold the switch arm 153 away from contacts 153a and when one or the other of the arms bridge its contacts a signal, such as bell alarm 154, is energized.

In operation when the mercury switch 44 is intermittently and momentarily closed through the rotation of screw S which drives arm 13 over segments, the relays 150 and 151 will be intermittently energized but these relays are set to bridge their contacts only after a time period greater than the time period for the arm 13 to travel from one segment to another and during normal operation an equilibrium is set up between the switch arms and they are never closed. If, however, the mercury switch 44 remains closed longer than the time required for the relay 150 to operate the switch arm 152 will bridge contacts 152a and energize the alarm 154 to indicate that the arm is stopped or if the rails 19 and 20 become deenergized during the travel of the arm 13, relay 151 will become deenergized and drop its arm to bridge contacts 153a and energize the alarm 154 to warn the operator.

Also after the timer has been started properly, that is, the proper set of contact rails 19 and 20 are energized in accordance with the direction of travel of the arm 13, it may during its operation function improperly due to the failure of the current supply to the proper rails or failure of the motor to move the arm in the proper direction for the energized rails, for example, such faulty operations might occur at a selected segment on which a reversal of operation is to occur. In order to prevent the timer from continuing operation under either of these faulty conditions an arrangement is provided whereby the current to the timer is immediately cut off. In the prior description of Fig. 9, it was pointed out that contactors 101 and 103, each of which controls the current supply to one set of contact rails were mechanically interlocked and also that motor contactors 102 and 104 were interlocked so that only one motor and one current supply contactor could function at one time. In the present improvement the current supply contactors 101 and 103 are interlocked with the motor contactors 102 and 104 by a switch $h$ of each of the contactors. As indicated, switch $h$ of contactor 101 and switch $h$ of contactor 104 are interlocked and are in circuit with a relay 160 between the two lines $x$ and $y$. Switches $h$ of each of the contactors 102 and 104 are likewise in circuit with the relay 160. In operation, if switch $h$ for supplying current to the advance rails 19 and 20 of the timer is closed and the arm 13 is being driven in the return direction, switch $h$ of the contactor 104 would also be closed and relay 160 would be energized to open the switches 161 and 162 to the main power lines $x$ and $y$ or if switch $h$ of contactor 102 is closed for supplying current to the return rails 19 and 20 and the arm 13 is advancing from the starting segment, the switch $h$ of contactor 103 will be closed and the relay 160 would be energized to open the main current supply switches 161 and 162.

The invention finds particular utility in complex chemical processes such as refining, treatment or conversion of hydrocarbons from any source, especially when the transformation is carried out in the presence of contact masses which may be inert or possess catalytic activity such as metals in solid or finely divided form or porous solids including blends of silica and alumina of natural or artificial origin with or without the addition of other active materials including metals or metallic compounds. Such masses often become reduced in activity by carbonaceous or other contaminating deposits during reaction periods and after a time it is necessary to regenerate the contact material, which step may be carried out while the mass remains in the reaction chamber. Before regeneration, the reaction chamber must be freed of any hydrocarbons remaining therein, which is done by imposing a vacuum thereon or by purging the case with steam or other inert gaseous medium. The regeneration of the mass is usually effected by admitting an oxidizing gas, such as heated air to the reaction chamber for burning the deposit and before admitting hydrocarbon vapors to the chamber after regeneration the residual product of combustion and of oxidizing medium must be removed from the chamber and this may be accomplished by again utilizing a vacuum or by admitting steam or other inert fluid. The various fluids used in a cycle of operation are usually admitted to the chamber by a common inlet and removed therefrom by a common outlet and it is essential that absolute control of the valves for the various fluids be maintained in order to eliminate any mixture thereof which might become hazardous. In order to efficiently carry out the process a plurality of reaction chambers are used, of which some will be receiving hydrocarbon vapors, while others are being purged and still others being regenerated. The present apparatus is admirably suited for controlling the valve operations for carrying out processes of this type as pointed out in my copending application, Serial No. 218,794, filed July 12, 1938, for Successive switching arrangement, now Patent No. 2,250,453, issued July 29, 1941, of which the present application is a continuation-in-part.

What I claim is:

1. An electric time switch which comprises a group of contacts, said contacts being aligned in parallel rows, a movable contact brush arm for engaging the contacts of each row, a selected contact in each row, a power source, means controlled by the selected contact of one row for advancing the brush arm over the contact rows and other means controlling the energization of contacts of certain rows during the advance movement of the brush arm, means controlled by the selected contact of another row for returning the brush arm over the contact rows and other means controlling the energization of contacts of certain other rows during the return movement of brush arm.

2. An electrical time switch which comprises cooperating rows of contacts, electrically independent movable brush means for engaging sequentially contacts of each row, a starting contact and a selected contact in each row, a power source, means controlled by the selected contact of one row for advancing the brush means of another row from its starting to its selected contact and other means for energizing said brush means during its advance period of travel, means controlled by the selected contact of another row for advancing the brush means of the said one row from its starting contact to its selected contact and other means for energizing the last mentioned brush means during its advance period of travel.

3. An electrical time switch which comprises two cooperating rows of contacts, electrically independent movable brush means for engaging sequentially contacts of each row, a starting contact and a selected contact in each row, a power source, means controlled by the selected contact of one row for advancing the brush means of the other row from its starting to its selected contact and other means for energizing said brush means during its advance period of travel, means controlled by the selected contact of said other row for advancing the brush means of said one row from its starting contact to its selected contact and other means for energizing the last mentioned brush means during its advance period of travel.

4. An electric time switch which comprises a series of contacts arranged in spaced rows, an energizing contact arm, chronometric means for reciprocating the contact arm, means for selectively energizing at least one of the contact rows in one direction of travel of the contact arm, means for selectively energizing at least one other of the contact rows in the reverse direction of travel of the contact arm, means for starting the arm in one direction, means controlled by a selected energized contact of one row for reversing the direction of travel of the arm, said chronometric means being operable to move the contact arm at the same rate in each direction of travel and to complete a cycle of operation at the end of both directions of its travel.

5. An electric time switch for sequentially energizing a plurality of circuits which comprises a series of contacts arranged in spaced rows, an energizing contact arm, chronometric means for reciprocating the contact arm, means for selectively energizing at least one of the contact rows in one direction of travel of the contact arm, means for selectively energizing at least one other of the contact rows in the reverse direction of travel of the contact arm, means for starting the arm in one direction, means controlled by a selected energized contact of one row for reversing the direction of travel of the arm, said chronometric means being operable to move the contact arm at the same rate in each direction of travel and to complete a cycle of operation at the end of both directions of its travel, means controlled by a selected contact of one other row which is energized in the reverse direction of travel of the contact arm to start the arm in the first direction of travel to begin a new cycle of operations.

6. An electric time switch which comprises a plurality of spaced rows of contacts adapted for controlling process cycles having varying time periods, an energizing contact arm, driving means for moving said contact arm in one direction over the contacts and for moving it in the reverse direction over the contacts, means to initiate the movement of the contact arm in one direction to start the cycle of operation, means controlling the energization of contacts of certain of the contact rows, means controlled by a selected energized contact of one row to reverse the direction of travel of the contact arm, means controlling the energization of contacts of certain other of the contact rows in the reverse direction of travel of the contact arm, said driving means being operable to move the contact arm at the same rate in each direction of travel and to complete a process cycle at the end of both directions of its travel.

7. An electric time switch for controlling process cycles having varying time periods which comprises a series of contacts arranged in a plurality of spaced parallel rows, an arm having an electrically independent energizing brush for each row of contacts, chronometric means for reciprocating the brushes in contact simultaneously with the contacts of each row, means operable to selectively supply current to certain brushes of the arm during one direction of travel of the arm and means operable to supply current to certain other of the brushes during the reverse travel of the arm, means controlled by a selected contact of one row for starting the brushes in one direction to energize certain rows of the contacts, means controlled by a selected one of the energized contacts to reverse the direction of travel of the arm, said chronometric means being operable to move the contact arm at the same rate in each direction of travel of the arm and to complete a process cycle at the end of both directions of its travel.

8. An electric time switch for controlling process cycles having varying time periods which comprises a series of contacts arranged in at least two spaced parallel rows including an advance and a return row, an energizing brush for said advance and said return row, driving means for moving the brushes over the contact rows in engagement with contacts of each row, means operable to selectively supply current to one of the brushes to energize the advance row of segments and means for transferring the current to the other brush during the return movement of the brushes to energize the return rows of segments, said driving means being operable to move the brushes at the same rate in each direction of travel in order to complete a process cycle at the end of both directions of travel.

9. An electric time switch for sequentially energizing a plurality of circuits which comprises a plurality of spaced rows of segments aligned in parallel, an arm extending transversely of said segment rows, an independent energizing brush on said arm for engaging each segment row, driving means for advancing the arm over the segment rows in one direction and driving means for returning the arm over the segment rows in the reverse direction, means for selectively supplying current to at least one brush during the advance movement of the arm to energize the segments of at least one row, means controlled by a selected segment of an energized row for effecting the return movement of the arm over the segment rows, other means on said selected segment for transferring the current to at least one other brush to energize the segments of at least one other segment row during the return movement of the arm, means controlled by a selected segment of a row energized during the return movement of the arm to end the cycle of operation and effect movement of the arm again in the advance direction to begin a new cycle.

10. An electric time switch for sequentially energizing a plurality of circuits which comprises a plurality of spaced rows of segments aligned in parallel, an arm extending transversely of said segment rows, an independent energizing brush on said arm for engaging each segment row, driving means for advancing the arm over the segment rows in one direction and driving means for returning the arm over the segment rows in the reverse direction, means for selectively supplying current to at least one brush during the advance movement of the arm to energize the segments of at least one row, means controlled by a selected segment of an energized row for effecting the return movement of the arm over the segment rows, other means on said selected segment for transferring the current to at least one other brush to energize the segments of at least one other segment row during the return movement of the arm, means controlled by a selected segment of a row energized during the return movement of the arm to end the cycle of operation and effect movement of the arm again in the advance direction to begin a new cycle, and switch means controlled by the first mentioned selected segment for preventing the arm from moving in the advance direction until the second mentioned selected segment is reached by the arm when it is moving in the return direction and other switch means controlled by the second mentioned selected segment for preventing the arm from moving in the return direction until the first mentioned selected segment is reached when the arm is moving in the advance direction.

11. An electric time switch for sequentially energizing a plurality of circuits to effect a process cycle which comprises a plurality of spaced rows of segments aligned in parallel, an arm extending transversely of said segment rows, an independent energizing brush on said arm for engaging each segment row, driving means for advancing the arm over the segment rows in one direction and driving means for returning the arm over the segment rows in the reverse direction, means for selectively supplying current to at least one brush during the advance movement of the arm to energize the segments of at least one row, means controlled by a selected segment of an energized row for effecting the return movement of the arm over the segment rows, other means on said selected segment for transferring the current to at least one other brush to energize the segments of at least one other segment row during the return movement of the arm, means controlled by a selected segment of a row energized during the return movement of the arm to end the cycle of operation and effect a movement of the arm again in the advance direction to begin a new cycle, and switch means controlled by the first mentioned selected segment for maintaining the current supply to the proper brushes when the arm is moving in the return direction and means controlled by the second mentioned selected segment for maintaining the current supply to the proper brushes when the arm is moving in the advance direction.

12. An electric time switch for sequentially energizing a plurality of circuits to effect a process cycle which comprises a plurality of spaced rows of segments aligned in parallel, an arm extending transversely of said segment rows, an independent energizing brush on said arm for engaging each segment row, driving means for advancing the arm over the segment rows in one direction and driving means for returning the arm over the segment rows in the reverse direction, means for selectively supplying current to at least one brush during the advance movement of the arm to energize the segments of at least one row, means controlled by a selected segment of an energized row for effecting the return movement of the arm over the segment rows, other means on said selected segment for transferring the current to at least one other brush to energize the segments of at least one other segment row during the return movement of the arm, said driving means being operable to move the arm at the same rate in both directions of travel in order to complete a cycle of operation on said last mentioned selected segment, switch means controlled by said driving means to indicate when the arm has stopped and other switch means controlled by said driving means to indicate the failure of current supply to the proper brushes.

13. An electric time switch for sequentially energizing a plurality of circuits which comprises a pair of spaced rows of segments aligned in parallel, an arm extending transversely of said segment rows, an independent energizing brush on said arm for engaging each segment row, current supply means for said brushes, driving means for advancing the arm over the segment rows in one direction and driving means for returning the arm over the segment rows in the reverse direction, switch means for selectively supplying current to one brush for energizing one segment row during the advance direction of travel of the arm and switch means for selectively supplying current to the other brush during the return travel of the arm, and switch means interlocking the current supply means and the driving means to prevent the arm from moving when current is supplied to the wrong energizing brush.

14. An electric time switch which comprises a support having front and rear faces, a pair of spaced parallel rows of segments on one face of said support, brush means for each row of segments mounted on said support for movement relative to said segments, current supply means for energizing selectively each of said brush means, driving means on said support for reciprocating said brush means over the segment rows to energize the segments of each row in sequence and the segment rows in alternation, terminal posts in engagement with the segments of each row and extending from the other face of said panel for connection with the mechanisms to be operated, said driving means being operable to move the brush means at the same rate in each direction of its travel to complete a cycle of operation at the end of both directions of travel.

15. An electric time switch which comprises a support having front and rear faces, a plurality of spaced rows of segments on one face of said support, said rows extending in substantially straight and parallel lines, brush means mounted on said support for movement relative to said segments for engaging a segment of each row simultaneously, current supply means for energizing said brush means, driving means on said support for reciprocating said brush means over the segment rows so that the segments of each row are energized in sequence and a cycle of operations completed by the reciprocating travel of the brush means, terminal posts in engagement with the segments of each row and extending from the other face of said panel, said terminal posts being selectively usable to receive electrical connections for supplying current to control the operations of a predetermined number of mechanisms and to effect simultaneously the operations of a plurality of mechanisms.

16. An electrical time switch which comprises a support having front and rear faces, a plurality of spaced rows of segments on one face of said support, said rows extending in substantially straight and parallel lines, an arm extending transversely of said segment rows, contact brushes carried by said arm for engaging simultaneously a segment of each row, current supply rails on said support for movably receiving said arm, electrical connections between said rails and said brushes, means including a motor on said support for reciprocating said brush means over the segment rows so that the segments of each row are energized in sequence and a cycle of operations completed by the reciprocating travel of the brush arm, terminal posts in engagement with the segments of each row and extending from the other face of said panel, said terminal posts being selectively usable to receive electrical connections for supplying current to control the operations of a predetermined number of mechanisms and to effect simultaneously the operations of a plurality of mechanisms.

17. An electrical time switch which comprises a support having front and rear faces, two sets of segments on one face of said support, each set of segments comprising two spaced rows of segments extending in substantially straight and parallel lines, a brush arm extending transversely of said sets of segment rows, contact brushes carried by said arm, current supply rails for each set of segments on said support for movably receiving said arm, electrical connections between said rails and said brushes, means including a motor on said support for reciprocating said brush arm over the segments of the rows in sequence, control means for supplying current to one set of segments during one direction of travel of the brush arm and for supplying current to the other set of segments during the reverse direction of travel of the arm to complete a cycle of operation during the reciprocating travel of the arm, terminal posts in engagement with the segments of each row and extending from the other face of the panel, said terminal posts being selectively usable to receive electrical connections for supplying current to control the operations of a predetermined number of mechanisms and to effect simultaneously the operations of a plurality of mechanisms.

18. An electrical time switch assembly comprising a casing having front and rear walls with interconnecting side walls, a panel board pivotally mounted within the casing forming spaces between said front and rear walls, a plurality of spaced rows of segments on one side of said panel extending in substantially straight and parallel lines, a cooperating contactor mounted on said panel for movement relative to said segments, current supply rails on said support for movably receiving said contactor, means on said panel board for reciprocating the contactor in engagement with the segments in timed sequence, terminal posts in engagement with said segments and extending from the other side of the panel, said terminal posts being selectively usable to receive electrical connections for supplying current to control the operations of a predetermined number of mechanisms and to effect simultaneously the operations of a plurality of mechanisms, one of said casing walls being movable to permit swinging the panel board outwardly of the casing for inspecting the elements held thereon.

HENRY J. APPEL.

CERTIFICATE OF CORRECTION.

Patent No. 2,324,474.  July 20, 1943.

HENRY J. APPEL.

It is hereby certified that error appears in the printed specification of the above numbered patent requiring correction as follows: Page 4, first column, line 14, after the word "through" insert --switches--; and that the said Letters Patent should be read with this correction therein that the same may conform to the record of the case in the Patent Office.

Signed and sealed this 31st day of August, A. D. 1943.

(Seal)

Henry Van Arsdale,
Acting Commissioner of Patents.